J. D. Smith.
Excavator.

N° 19,104. Patented Jan. 12, 1858.

UNITED STATES PATENT OFFICE.

J. D. SMITH, OF PANTON, VERMONT.

EXCAVATOR.

Specification of Letters Patent No. 19,104, dated January 12, 1858.

*To all whom it may concern:*

Be it known that I, J. D. SMITH, of Panton, in the county of Addison and State of Vermont, have invented a new and useful Implement for Grading Designed for Repairing Roads and Similar Purposes; and I do hereby declare that the following is a full, clear, and exact description of the same, reference being had to the annexed drawings, making a part of this specification, in which—

Figure 1:
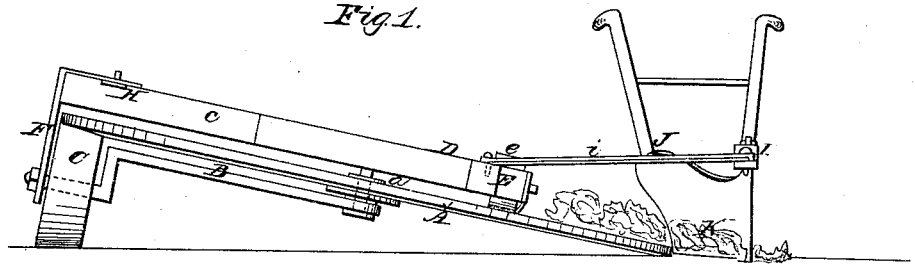
Figure 2:
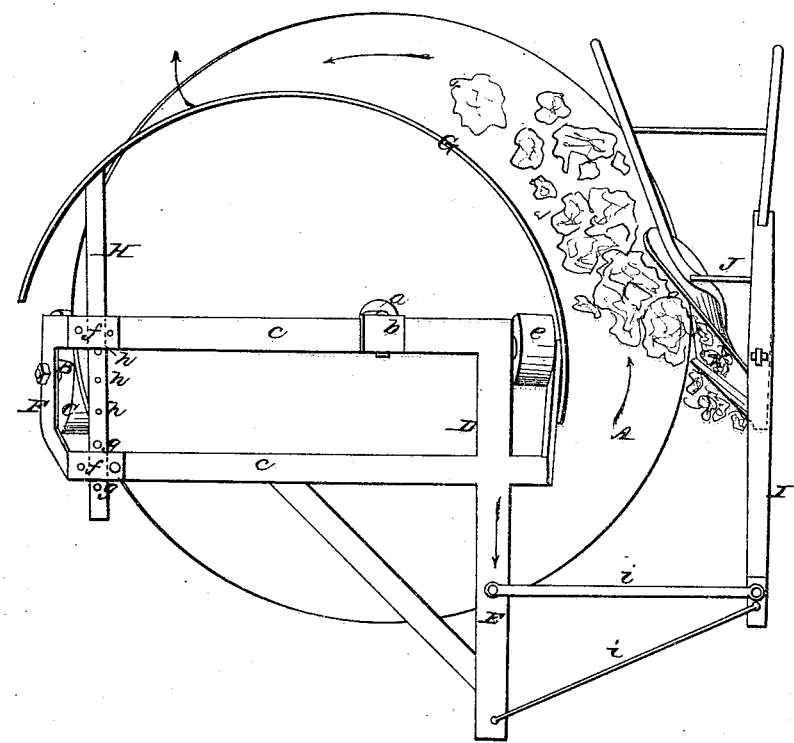

Figure 1, is a front view of my improvement. Fig. 2, is a plan or top view of ditto.

Similar letters of reference indicate corresponding parts in the two figures.

This invention relates to the employment or use of a plow in connection with an inclined rotary platform and discharging device arranged substantially as hereinafter shown, whereby the plow and platform are drawn along by one and the same team simultaneously and the platform rotated, the plow casting the earth upon the platform which, by its rotation, conveys it over the desired spot the earth being discharged from the platform by the discharging device.

My improvement consists in the employment of a flat conveyer wheel or circular revolving platform, having one of its sides supported by contact with a vertical wheel placed below the platform and running upon the ground; also in the employment of an adjustable discharging strip arranged upon the top of the platform.

I would here remark that I do not claim to be the original inventor of excavating devices in which a revolving conveyer is employed in connection with a plow. The patent of James Roe Feb. 15, 1838 and of Lockwood, 1841, are examples of such devices. These inventions show the conveyer wheel placed on a steep angle with a wide flange at the outer edge, so bent as to rest flat on the ground. This flange prevents the proper action of the conveyer, because if the ground is uneven or higher, where the flange rests, than the ground at the outer edge of the flange, then the conveyer cannot enter the earth at the desired point. But by the employment of a flat platform or conveyer, as in my improvement, the edge thereof is not lifted or impeded by any irregularity of the surface of the ground, but acts at once upon the point directed. The flat platform also serves, to a certain extent to cut into and loosen the ground, and thus, in some degree loads itself.

In all devices with which I am acquainted there has always been more or less difficulty to make the platform revolve with certainty and regularity, because one side of the platform rests upon the ground and derives whatever motion it receives by contact therewith. No other side of the platform has any support, so that when a quantity of earth is carried up to that side opposite the side which rests upon the ground, the tendency is to lift the platform up. This lightens the pressure of the platform upon the ground and causes it to slip, rendering its revolutions uncertain and unsteady.

My improvement obviates the above difficulty for the bottom of my platform is made flat like the top; and the bottom, at one side, rests upon a traveling wheel, which by its rotation imparts motion to the platform. Both sides of my platform rest upon good supports—one side being upon the ground, the other upon a wheel which rests upon the ground. If the greatest weight carried by the platform is on that side nearest the ground then, of course the platform is sure to be pressed into contact with the earth in such a manner that it cannot slip. When the weight ascends, the friction between the undersurface of the platform and the traveling wheel is increased, and all slippage is prevented. The employment of a flat platform supported by a traveling wheel as in my improvement also gives stability to the machine, and increases its durability.

To enable those skilled in the art to fully understand and construct my invention I will proceed to describe it.

A represents a circular platform which may be constructed of wood of any proper diameter. The axis (*a*) of the platform has its lower end stepped in the inner end of an axle B. The outer end of which has a wheel C, on it, on which one side of the platform A rests, the opposite side being on the ground, see Fig. 1. The platform therefore will have an inclined position.

The upper end of the axis (*a*) is attached to the back part of a frame D as shown at (*b*) Fig. 2. This frame is formed of two bars (*c*) (*c*) which are attached at one end to a draft pole E, the opposite ends being connected by a pendent F, the lower end of which is fitted on the outer end of the axle B. To the inner end of the frame D a roller (*e*) is attached, said roller resting on the platform A. To the inner end of the frame D, one end of a curved metallic strip or plate G is attached. The opposite end of the strip or plate G is attached to a sliding bar H which is placed at the outer end of the frame D and fitted in guides (*f*) (*f*) thereon. The bar H may be secured at any desired point by pins (*g*) which are fitted in holes (*h*) in the bar H at either side of the front bar (*c*) of the frame D, see Fig. 2.

To the draft pole E the front end of the beam I, of a plow J, is attached by two bars or rods (*i*) (*i*). The mold board K, of the plow adjoins the lower side of the platform A. The plow is of usual construction and therefore does not require to be minutely described.

The operation is as follows: As the machine is drawn along the plow J, is guided by an attendant and the mold board K, throws the earth on the depressed and adjoining end of the platform. The platform is rotated in the direction indicated by the arrows Fig. 2, by the friction of the wheel C, at one end and its contact with the ground at the opposite end, and the earth as it is thrown on the platform is conveyed around by it and discharged therefrom by the strip G the outer end of which projects beyond the periphery of the platform as shown in Fig. 2. The earth may be discharged from the platform at varying points by adjusting the outer end of the plate G nearer to or farther from the back part of the frame D, by means of the sliding bar H.

By means of this device roads may be graded with great facility, the plow J being run along at the sides and the earth conveyed therefrom to the center.

Having thus described my invention what I claim as new and desire to secure by Letters Patent, is,

1. The employment of a flat circular platform A, having one of its sides supported by a vertical traveling wheel C, placed below the platform and running upon the ground.

2. I also claim the employment of an adjustable discharging strip G when arranged and operating as herein shown.

J. D. SMITH.

Witnesses:
W. G. SPRUGUS,
R. COLLINS.